(12) United States Patent
Zha et al.

(10) Patent No.: US 11,415,829 B2
(45) Date of Patent: Aug. 16, 2022

(54) LIQUID CRYSTAL DISPLAY PANEL AND LIQUID CRYSTAL DISPLAY DEVICE

(71) Applicant: TCL CHINA STAR OPTOELECTRONICS TECHNOLOGY CO., LTD., Guangdong (CN)

(72) Inventors: Bao Zha, Guangdong (CN); Miao Jiang, Guangdong (CN); Jiangbo Yao, Guangdong (CN); Lixuan Chen, Guangdong (CN); Xin Zhang, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/053,072

(22) PCT Filed: Sep. 21, 2020

(86) PCT No.: PCT/CN2020/116512
§ 371 (c)(1),
(2) Date: Nov. 5, 2020

(87) PCT Pub. No.: WO2022/032813
PCT Pub. Date: Feb. 17, 2022

(65) Prior Publication Data
US 2022/0043297 A1 Feb. 10, 2022

(51) Int. Cl.
*G02F 1/1335* (2006.01)
*G02F 1/133* (2006.01)

(52) U.S. Cl.
CPC .... *G02F 1/133514* (2013.01); *G02F 1/13312* (2021.01); *G02F 1/13318* (2013.01); *G02F 1/133512* (2013.01)

(58) Field of Classification Search
CPC ......... G02F 1/133512; G02F 1/133514; G02F 1/13312; G02F 1/13318
See application file for complete search history.

(56) References Cited

U.S. PATENT DOCUMENTS

| | | |
|---|---|---|
| 2002/0171800 A1 | 11/2002 | Miyazaki et al. |
| 2008/0158461 A1 | 7/2008 | Kenmochi et al. |
| (Continued) | | |

FOREIGN PATENT DOCUMENTS

| | | |
|---|---|---|
| CN | 101211083 A | 7/2008 |
| CN | 101910980 A | 12/2010 |
| (Continued) | | |

*Primary Examiner* — Jessica M Merlin
(74) *Attorney, Agent, or Firm* — The Roy Gross Law Firm, LLC; Roy Gross

(57) ABSTRACT

The present invention discloses a liquid crystal display panel and a liquid crystal display device. The liquid crystal display panel comprises a first substrate and a second substrate. A first underlay substrate of the first substrate is disposed with an optical sensor. Sensing transistors of the optical sensor includes a first semiconductor. A color filter layer is disposed between the first semiconductor and the first underlay substrate. The color filter layer includes color resist blocks and a light shielding portion. an orthographic projection of the light shielding portion on the first underlay substrate covers an orthographic projection of the first semiconductor on the first underlay substrate.

18 Claims, 10 Drawing Sheets

(56) References Cited

U.S. PATENT DOCUMENTS

| | | | |
|---|---|---|---|
| 2010/0220269 A1* | 9/2010 | Takama | G02F 1/133514 349/106 |
| 2011/0018850 A1 | 1/2011 | Uehata et al. | |
| 2011/0043486 A1* | 2/2011 | Hagiwara | G06F 3/042 345/175 |
| 2011/0069038 A1* | 3/2011 | Fann | G06F 3/0386 345/175 |
| 2018/0143500 A1 | 5/2018 | Yu et al. | |
| 2019/0187356 A1* | 6/2019 | Hirabayashi | G02F 1/133617 |
| 2021/0072573 A1* | 3/2021 | Su | G02F 1/133514 |

FOREIGN PATENT DOCUMENTS

| | | |
|---|---|---|
| CN | 105607368 A | 5/2016 |
| CN | 110333635 A | 10/2019 |
| CN | 110854173 A | 2/2020 |
| CN | 111029343 A | 4/2020 |
| JP | H0973088 A | 3/1997 |
| JP | H10104603 A | 4/1998 |

\* cited by examiner

LIQUID CRYSTAL DISPLAY PANEL AND LIQUID CRYSTAL DISPLAY DEVICE

FIELD OF INVENTION

The present invention relates to a field of display technologies, especially relates to a liquid crystal display panel and a liquid crystal display device.

BACKGROUND OF INVENTION

With development of display technologies, for effectively mitigating loss of light efficiency and an increasing cost, integrating sensors inside a display panel becomes a trend in industries.

However, in a display panel embedded with an integrated optical sensor, because the optical sensor usually employs hydrogenated amorphous silicon (a-Si:H) as a photosensitive semiconductor material to form a semiconductor layer, and hydrogenated amorphous silicon is easily affected by ambient light. Especially under a circumstance of a stronger ambient light, the ambient light irradiating the semiconductor layer formed by hydrogenated amorphous silicon result in leakage current generated on rear channels of the semiconductor layer, which influences normal use of the optical sensor.

SUMMARY OF INVENTION

Technical Issue

In a conventional display panel embedded with an integrated optical sensor A semiconductor layer formed by hydrogenated amorphous silicon is easily affected by ambient light. Ambient light irradiating the semiconductor layer formed by hydrogenated amorphous silicon result in leakage current generated on rear channels of the semiconductor layer, which influences normal use of the optical sensor.

Technical Solution

In a first aspect, the present invention embodiment a liquid crystal display panel, comprising:
a first substrate, comprising a first underlay substrate;
a second substrate disposed opposite to the first substrate;
an optical sensor disposed on a side of the first underlay substrate near the second substrate, wherein the optical sensor comprises a sensing transistor, the sensing transistor comprises a first gate electrode, a first semiconductor, and a first source and drain electrode connected to the first semiconductor; and
a color filter layer disposed on a side of the first semiconductor away from the first underlay substrate, wherein the color filter layer comprises a plurality of color resist blocks arranged at intervals;
wherein the color filter layer further comprises a light shielding portion located between adjacent two of the color resist blocks, and an orthographic projection of the light shielding portion on the first underlay substrate covers an orthographic projection of the first semiconductor on the first underlay substrate.

In some embodiments, the light shielding portion comprises a first color resist layer and a second color resist layer stacked on each other, and a color of the first color resist layer is different from a color of the second color resist layer.

In some embodiments, the first color resist layer is one of a red color resist layer and a green color resist layer, the second color resist layer is the other of the red color resist layer and the green color resist layer.

In some embodiments, the first color resist layer or the second color resist layer is formed integrally with an adjacent one of the color resist blocks.

In some embodiments, a thickness of the color resist block integrally formed with the first color resist layer or the second color resist layer is equal to a thickness of the light shielding portion.

In some embodiments, an orthographic projection of the light shielding portion on the first underlay substrate overlaps an orthographic projection of the first semiconductor on the first underlay substrate.

In some embodiments, the optical sensor further comprises a switch transistor, the switch transistor comprises a second gate electrode disposed in a same layer with the first gate electrode, a second semiconductor disposed in a same layer with the first semiconductor, and a second source and drain electrode disposed in a same layer with the first source and drain electrode; and a light shielding layer is disposed on a side of the second semiconductor away from the first underlay substrate, a gap region is defined between adjacent two of the color resist blocks, the light shielding layer comprises a light shielding block disposed in the gap region, an orthographic projection of the light shielding block on the first underlay substrate covers an orthographic projection of the second semiconductor on the first underlay substrate.

In some embodiments, the first substrate further comprises:
a gate electrode insulation layer covering the first gate electrode and the second gate electrode, wherein the first semiconductor and the second semiconductor are disposed on a side of the gate electrode insulation layer away from the first underlay substrate, the first source and drain electrode is disposed on a side of the first semiconductor away from the first underlay substrate, and the second source and drain electrode is disposed on a side of the second semiconductor away from the first underlay substrate; and
a passivation layer covering the first semiconductor, the first source and drain electrode, the second semiconductor, the second source and drain electrode, and the gate electrode insulation layer; and
the color filter layer is disposed on a side of the passivation layer away from the first underlay substrate.

In some embodiments, the second substrate comprises a second underlay substrate, the color filter layer is disposed on a side of the second underlay substrate near the first substrate.

In a second aspect, the present invention further provides a liquid crystal display device, the liquid crystal display device comprises a light beam emitter and a liquid crystal display panel, the light beam emitter is configured to emit a projection light beam for setting a color, and the liquid crystal display panel comprises:
a first substrate, comprising a first underlay substrate;
a second substrate disposed opposite to the first substrate;
an optical sensor disposed on a side of the first underlay substrate near the second substrate, wherein the optical sensor sensing a projection light beam projected by the light beam emitter to the liquid crystal display panel, and the optical sensor comprises a sensing transistor, the sensing transistor comprises a first gate electrode, a first semiconductor, and a first source and drain electrode connected to the first semiconductor; and a color filter layer disposed on a side of the first semiconductor away from the first underlay substrate, wherein the color filter layer comprises a plurality of color resist blocks arranged at intervals;

wherein the color filter layer further comprises a light shielding portion located between adjacent two of the color resist blocks, and an orthographic projection of the light shielding portion on the first underlay substrate covers an orthographic projection of the first semiconductor on the first underlay substrate.

In some embodiments, the light shielding portion comprises a first color resist layer and a second color resist layer stacked on each other, and a color of the first color resist layer is different from a color of the second color resist layer.

In some embodiments, the first color resist layer is one of a red color resist layer and a green color resist layer, the second color resist layer is the other of the red color resist layer and the green color resist layer.

In some embodiments, a color of the projection light beam is yellow.

In some embodiments, the first color resist layer or the second color resist layer is formed integrally with an adjacent one of the color resist blocks.

In some embodiments, a thickness of the color resist block integrally formed with the first color resist layer or the second color resist layer is equal to a thickness of the light shielding portion.

In some embodiments, a thickness of the first color resist layer and a thickness of the second color resist layer are 1-1.5 microns.

In some embodiments, an orthographic projection of the light shielding portion on the first underlay substrate overlaps an orthographic projection of the first semiconductor on the first underlay substrate.

In some embodiments, the optical sensor further comprises a switch transistor, the switch transistor comprises a second gate electrode disposed in a same layer with the first gate electrode, a second semiconductor disposed in a same layer with the first semiconductor, and a second source and drain electrode disposed in a same layer with the first source and drain electrode; and a light shielding layer is disposed on a side of the second semiconductor away from the first underlay substrate, a gap region is defined between adjacent two of the color resist blocks, the light shielding layer comprises a light shielding block disposed in the gap region, an orthographic projection of the light shielding block on the first underlay substrate covers an orthographic projection of the second semiconductor on the first underlay substrate.

In some embodiments, the first substrate further comprises:

a gate electrode insulation layer covering the first gate electrode and the second gate electrode, wherein the first semiconductor and the second semiconductor are disposed on a side of the gate electrode insulation layer away from the first underlay substrate, the first source and drain electrode is disposed on a side of the first semiconductor away from the first underlay substrate, and the second source and drain electrode is disposed on a side of the second semiconductor away from the first underlay substrate; and a passivation layer covering the first semiconductor, the first source and drain electrode, the second semiconductor, the second source and drain electrode, and the gate electrode insulation layer; and the color filter layer is disposed on a side of the passivation layer away from the first underlay substrate.

In some embodiments, the second substrate comprises a second underlay substrate, the color filter layer is disposed on a side of the second underlay substrate near the first substrate.

Advantages

The light shielding portion in the color filter layer is used to filter and absorb ambient light, and the light shielding portion has at least two stacked color resist layer of different colors, which is able to effectively lower light intensity of irradiation of the ambient light on the first semiconductor. Therefore, influence of the ambient light to the optical sensor is reduced to prevent the ambient light from causing rear channels of the first semiconductor to generate leakage current and to enhance a signal-noise ratio of the optical sensor. In the meantime, a projection light beam for setting a color can be emitted by using a light beam emitter to achieve light control to the liquid crystal display panel. Furthermore, protection to the optical sensor can be achieved without additional material and process, which lowers production costs.

DESCRIPTION OF DRAWINGS

Specific embodiments of the present invention are described in details with accompanying drawings as follows to make technical solutions and advantages of the present invention clear.

Figure 1:
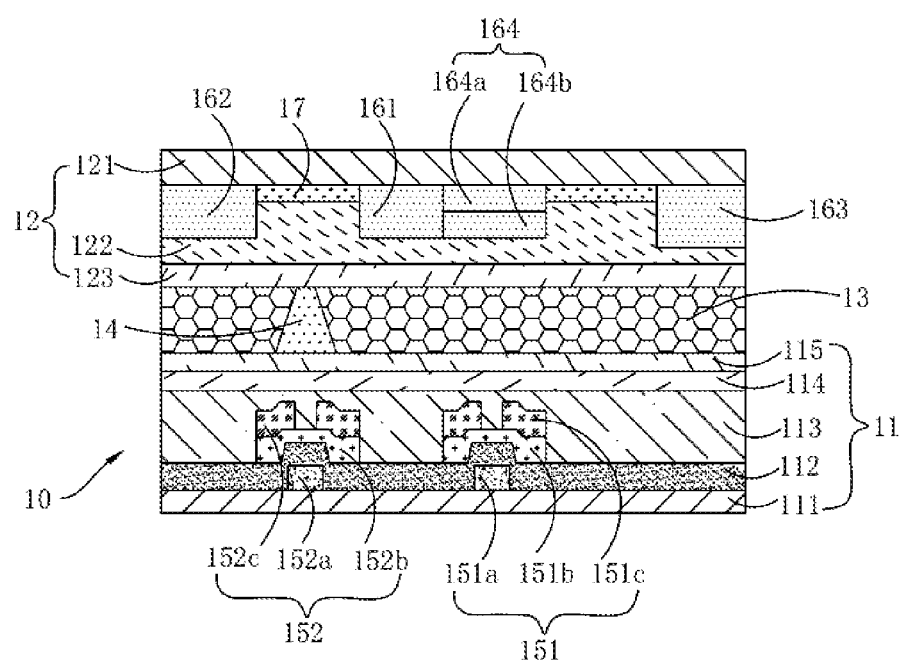
FIG. 1 is a first schematic structural view of a liquid crystal display panel of the present invention.

10, liquid crystal display panel; 11, first substrate; 111, first underlay substrate; 112, gate electrode insulation layer; 113, passivation layer; 114, first pixel electrode; 115, first alignment film layer; 116, planarization layer; 12, second substrate; 121, second underlay substrate; 122, second pixel electrode; 123, second alignment film layer; 13, liquid crystal layer; 14, support column; 151, sensing transistor; 151a, first gate electrode, 151b, first semiconductor; 151c, first source and drain electrode; 152, switch transistor; 152a, second gate electrode, 152b, second semiconductor; 152c, second source and drain electrode; 161, red color resist blocks; 162, green color resist blocks; 163, blue color resist blocks; 164, light shielding portion; 164a, first color resist layer; 164b, second color resist layer; 17, light shielding block; 20, light beam emitter.

DETAILED DESCRIPTION OF PREFERRED EMBODIMENTS

Each of the following embodiments is described with appending figures to illustrate specific embodiments of the present invention that are applicable. The terminologies of direction mentioned in the present invention, such as "upper", "lower", "front", "rear", "left", "right", "inner", "outer", "side surface", etc., only refer to the directions of the appended figures. Therefore, the terminologies of direction are used for explanation and comprehension of the present invention, instead of limiting the present invention. In the figures, units with similar structures are marked with the same reference characters.

The present invention aims at the technical issue that in a conventional display panel embedded with an integrated optical sensor A semiconductor layer formed by hydrogenated amorphous silicon is easily affected by ambient light. Ambient light irradiating the semiconductor layer formed by hydrogenated amorphous silicon result in leakage current generated on rear channels of the semiconductor layer, which influences normal use of the optical sensor.

With reference to FIG. 1, a liquid crystal display panel 10 comprises a first substrate 11 and a second substrate 12 disposed opposite to each other. A liquid crystal layer 13 and a support column 14 are disposed between the first substrate 11 and the second substrate 12. The support column 14 contact the first substrate 11 and the second substrate 12 for providing the first substrate 11 and the second substrate 12 with a sufficient interval. The first substrate 11 can be an array substrate, and the second substrate 12 can be a color filter substrate.

Specifically, the liquid crystal display panel 10 further comprises an optical sensor disposed on the first substrate 11. The first substrate 11 comprises a first underlay substrate 111, and the optical sensor is disposed on a side of the first underlay substrate 111 near the second substrate 12.

Specifically, the optical sensor comprises a sensing transistor 151 and a switch transistor 152.

In an embodiment, the sensing transistor 151 comprises a first gate electrode 151a, a first semiconductor 151b, and a first source and drain electrode 151c disposed sequentially along a direction away from the first underlay substrate 111. The switch transistor 152 comprises a second gate electrode 152a disposed in a same layer with the first gate electrode 151a, a second semiconductor 152b disposed in a same layer with the first semiconductor 151b, and a second source and drain electrode 152c disposed in a same layer with the first source and drain electrode 151c.

The switch transistor 152 is configured to control the optical sensor to turn on or off. The sensing transistor 151 is configured to detect a projection light beam projected on the liquid crystal display panel 10, and when the projection light beam irradiates the sensing transistor 151, a resistance of a resistor of the first semiconductor 151b varies, the first semiconductor 151b transmits a light sensitive signal to a control module of the liquid crystal display panel 10, and then the control module controls the liquid crystal display panel 10 to operate accordingly.

A manufacturing material of the first semiconductor 151b and a manufacturing material of the second semiconductor 152b can be a visible light photosensitive material, for example, hydrogenated amorphous silicon.

Specifically, the liquid crystal display panel 10 further comprises a color filter layer disposed on a side of the first semiconductor 151b away from the first underlay substrate 111. The color filter layer comprises a plurality of color resist blocks disposed at intervals. The color filter layer comprises red color resist blocks 161, green color resist blocks 162, and blue color resist blocks 163.

The color filter layer further comprises a light shielding portion 164 disposed between adjacent two of the color resist blocks. An orthographic projection of the light shielding portion 164 on the first underlay substrate 111 covers an orthographic projection of the first semiconductor 151b on the first underlay substrate 111.

It should be explained that the light shielding portion 164 and the color resist blocks are formed by a color resist material. Ambient light is filtered and absorbed by the light shielding portion 164 to lower light intensity of ambient light irradiating the first semiconductor 151b to lower influence of the ambient light to the optical sensor, prevent the ambient light from causing rear channels of the first semiconductor 151b to generate leakage current, and improve a signal-noise ratio of the optical sensor. In the meantime, a light beam emitter can be use to transmit a projection light beam for setting a color. The projection light beam for setting a color can pass through the light shielding portion 164 and irradiates the first semiconductor 151b to achieve light control to the liquid crystal display panel 10. Furthermore, the light shielding portion 164 and the color resist blocks are formed simultaneously, and protection to the optical sensor can be achieved without additional material, which lowers production costs.

Specifically, the light shielding portion 164 comprises a first color resist layer 164a and a second color resist layer 164b stacked on each other. A color of the first color resist layer 164a is different from a color of the second color resist layer 164b, a color of a color resist material forming the first color resist layer 164a is different from a color of a color resist material forming the second color resist layer 164b such that ambient light can be filter and absorbed better.

It should be explained that the light shielding portion 164 can be a single layer. The light shielding portion 164 can also comprise a color resist layer with three stacked layers, and colors of the three layers of the color resist layer are different.

Figure 2:
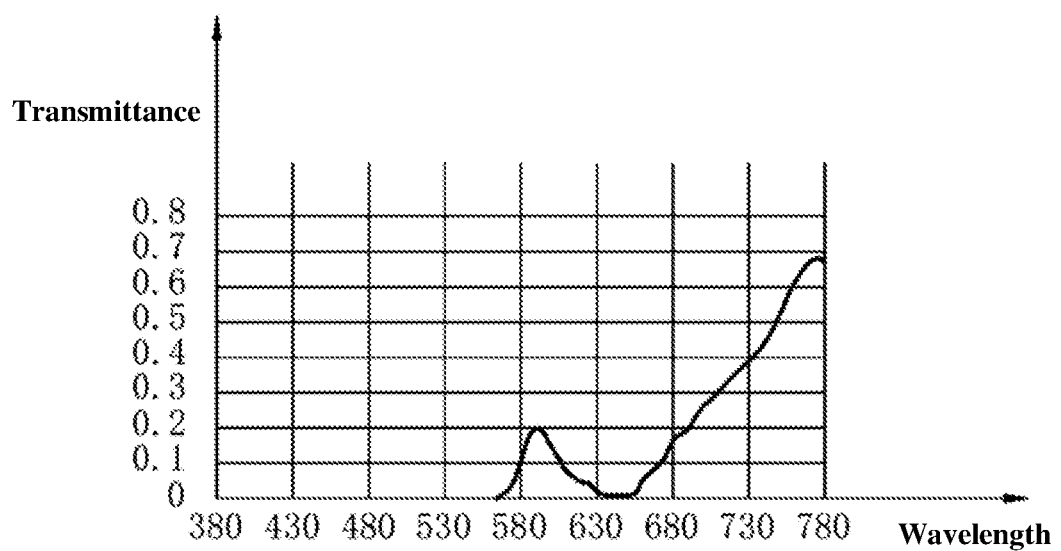
FIG. 2 is a schematic chart of transmittances of light of different wavelengths of the present invention in a light shielding portion formed by stacked red color resist layer and green color resist layer.

In an embodiment, with reference to FIGS. 1 and 2, the first color resist layer 164a is one of a red color resist layer and a green color resist layer, and the second color resist layer 164b is the other of the red color resist layer and the green color resist layer.

With reference to FIGS. 1 and 2, FIG. 2 is a schematic chart of transmittances of light of different wavelengths of the present invention in a light shielding portion 164 formed by stacked red color resist layer and green color resist layer. A vertical coordinate axis of FIG. 2 indicates a transmittance while a horizontal coordinate axis indicates a wavelength of light.

With reference to FIGS. 1 and 2, a range of wavelength of visible light of the ambient light capable of passing through the light shielding portion 164 is from 570 to 630 nms. A person of ordinary skill in the art can understand that the range of wavelength of light from 570 to 630 nms corresponds to yellow light, and the orange light in the ambient light has lower light energy such that the orange light of the ambient light has lower influence to the first semiconductor 151b. The light shielding portion 164 can absorb light in the ambient light except the orange light, and the light shielding portion 164 can also partially absorb the yellow light to lower a transmittance of the orange light in the light shielding portion 164, which effectively lowers interference of the ambient light to the optical sensor. At the same time, a set color of the projection light beam emitted by light beam emitter 20 can be yellow such that a stronger yellow projection light beam can be used to achieve light control to liquid crystal display panel 10.

In an embodiment, the first color resist layer 164a or the second color resist layer 164b is formed integrally with an adjacent one of the color resist blocks to reduce processes of the liquid crystal display panel 10.

Specifically, a thickness of the color resist block formed integrally with the first color resist layer 164a or the second color resist layer 164b is equal to a thickness of the light shielding portion 164 to prevent a height difference between the light shielding portion 164 and the color resist blocks resulting rupture of a film layer formed on the color resist layer.

In an embodiment, a thickness of each of the red color resist blocks 161 and the green color resist blocks 162 can be 2-3 microns. A thickness of each of the first color resist layer 164a and the second color resist layer 164b的 thickness can be 1-1.5 microns. A thickness of the blue color resist blocks 163 can be 0.2 microns greater than a thickness of the light shielding portion 164.

In an embodiment, an area of an orthographic projection of the red color resist blocks 161 on the first underlay substrate 111, an area of an orthographic projection of the green color resist blocks 162 on the first underlay substrate 111, and an area of an orthographic projection of the blue color resist blocks 163 on the first underlay substrate 111 are equal to one another.

In an embodiment, an orthographic projection of the first color resist layer 164a on the first underlay substrate 111 overlaps an orthographic projection of the second color resist layer 164b on the first underlay substrate 111. Namely, a shape of the orthographic projection of the first color resist layer 164a on the first underlay substrate 111 is the same as a shape of the orthographic projection of the second color resist layer 164b on the first underlay substrate 111, and an area of the orthographic projection of the first color resist layer 164a on the first underlay substrate 111 is the same as an area of the orthographic projection of the second color resist layer 164b on the first underlay substrate 111.

Specifically, the orthographic projection of the light shielding portion 164 on the first underlay substrate 111 overlaps the orthographic projection of the first semiconductor 151b on the first underlay substrate 111. Namely, a shape of the orthographic projection of the light shielding portion 164 on the first underlay substrate 111 is the same as a shape of the orthographic projection of the first semiconductor 151b on the first underlay substrate 111, and an area of the orthographic projection of the light shielding portion 164 on the first underlay substrate 111 is the same as an area of the orthographic projection of the first semiconductor 151b on the first underlay substrate 111 such that the first semiconductor 151b can be used to shield light emitted by a light source of the liquid crystal display panel 10 to prevent the light emitted by the light source of the liquid crystal display panel 10 from passing through the light shielding portion 164 and affecting normal display of the liquid crystal display panel 10.

Furthermore, a combination projection of an orthographic projection of the first gate electrode 151a on the first underlay substrate 111 and an orthographic projection of the first source and drain electrode 151c on the first underlay substrate 111 covers the orthographic projection of the light shielding portion 164 on the first underlay substrate 111.

It should be explained that in liquid crystal display panel 10, the first gate electrode 151a and the first source and drain electrode 151c can be made of conductive metal. The first gate electrode 151a and the first source and drain electrode 151c with poor light transmittance can be used to shield light emitted by a light source of the liquid crystal display panel 10 to prevent the light emitted by the light source of the liquid crystal display panel 10 from passing through light shielding portion 164 and affecting normal display of the liquid crystal display panel 10.

In an embodiment, the first substrate 11 further comprises a gate electrode insulation layer 112, a passivation layer 113, a first pixel electrode 114, and a first alignment film layer 115 that are disposed sequentially along a direction away from the first underlay substrate 111.

The gate electrode insulation layer 112 covers the first gate electrode 151a and the second gate electrode 152a. The first semiconductor 151b and the second semiconductor 152b is disposed on a side of the gate electrode insulation layer 112 away from the first underlay substrate 111. The passivation layer 113 covers the first semiconductor 151b, the first source and drain electrode 151c, the second semiconductor 152b, a second source and drain electrode 152c, and the gate electrode insulation layer 112.

Specifically, the second substrate 12 comprises second underlay substrate 121, a second pixel electrode 122 disposed on a side of the second underlay substrate 121 near the first substrate 11, and a second alignment film layer 123 disposed on a side of the second pixel electrode 122 near the first substrate 11.

In an embodiment, the color filter layer is disposed on a side of the second underlay substrate 121 near the first substrate 11.

The color filter layer can be disposed on a side of the second underlay substrate 121 near the first substrate 11. In the meantime, the second pixel electrode 122 can be disposed on a side of the color filter layer near the first substrate 11.

Figure 3:
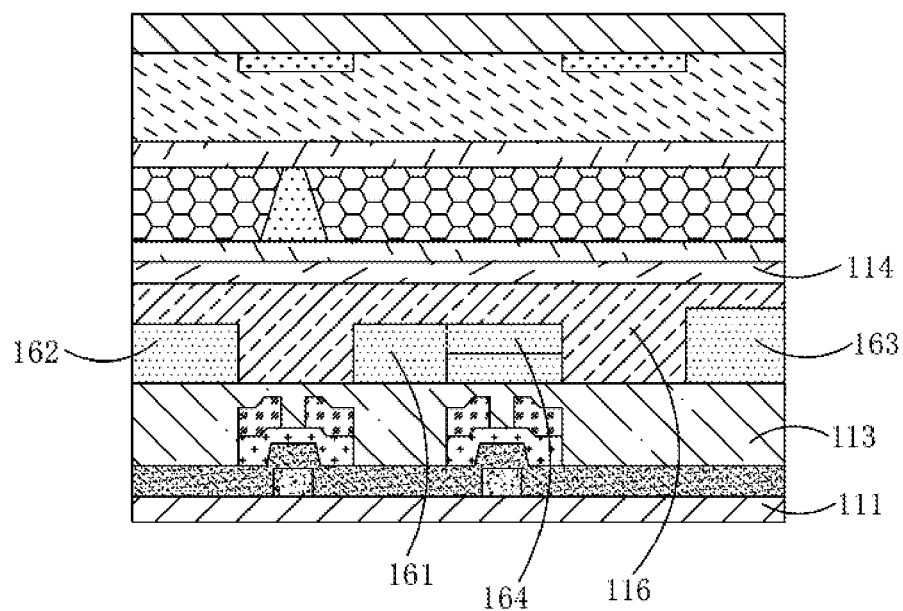
FIG. 3 is a second schematic structural view of the liquid crystal display panel of the present invention.

With reference to FIG. 3, the color filter layer can also be disposed on a side of the passivation layer 113 away from the first underlay substrate 111.

In an embodiment, the first substrate 11 further comprises a planarization layer 116 covering the color filter layer and the passivation layer 113. The first pixel electrode 114 is disposed on a side of the planarization layer 116 away from the first underlay substrate 111.

Specifically, a light shielding layer is disposed on a side of the second semiconductor 152b away from the first underlay substrate 111. A gap region is defined between adjacent two of the color resist blocks. The light shielding layer comprises a light shielding block 17 disposed in the gap region. An orthographic projection of the light shielding block 17 on the first underlay substrate 111 covers an orthographic projection of the second semiconductor 152b on the first underlay substrate 111. The light shielding block 17 disposed in the gap region can prevent light leakage between adjacent two of the color resist blocks. Simultaneously, the light shielding block 17 can shield the second semiconductor 152b to prevent the ambient light from irradiating the second semiconductor 152b and affecting normal use of the switch transistor 152.

FIGS. 1 and 3 only shows the condition of the light shielding layer disposed on the second substrate 12. It should be explained that light shielding layer can also be disposed on the first substrate 11.

Figure 4:
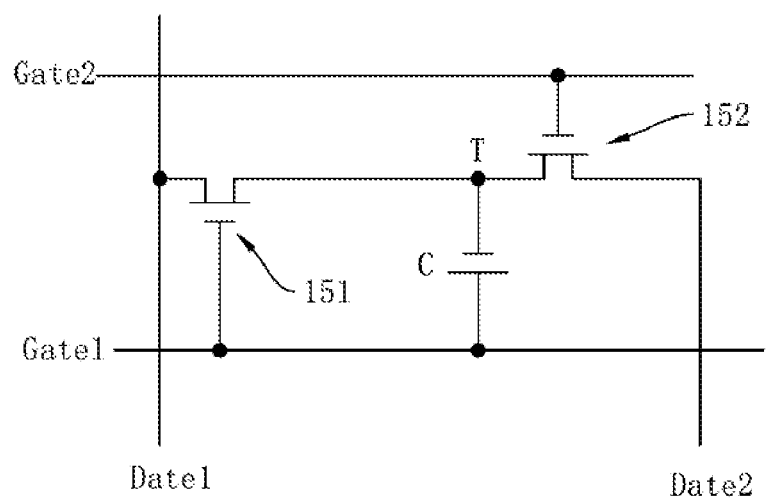
FIG. 4 is a schematic structural view of a circuit of an optical sensor of an embodiment of the present invention.

With reference to FIG. 4, Specifically, the first substrate 11 further comprises data lines disposed vertically and scan lines disposed horizontally. The first gate electrode 151a of the sensing transistor 151 is electrically connected to a first scan line Gate1. A source electrode of the first source and drain electrode 151c is electrically connected to a first data line Date1. A drain electrode of the first source and drain electrode 151c and a drain electrode of the second source and drain electrode 152c of the switch transistor 152 are electrically connected to a first node T. A source electrode of the second source and drain electrode 152*c* is electrically connected to a second data line Date2. The second gate electrode 152*a* is electrically connected to a second scan line Gate2.

In an embodiment, the optical sensor further comprises a capacitor C, an end of the capacitor C is electrically connected to the first node T, another end of the capacitor C is electrically connected to the first scan line Gate1.

With reference to FIGS. 5 to 9, FIGS. 5 to 9 are schematic views of a manufacturing process of a second substrate of an embodiment of the present invention.

Figure 5:
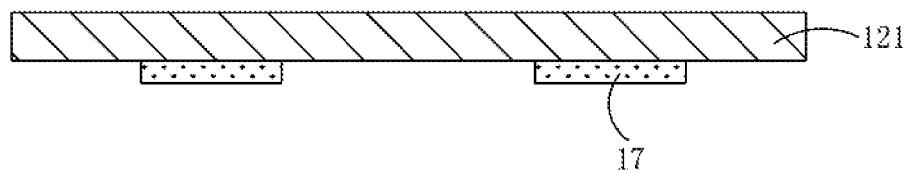
FIGS. 5 to 9 are schematic views of a manufacturing process of a second substrate of an embodiment of the present invention.

With reference to FIG. 5, a light shielding block 17 if formed on a corresponding portion of the second underlay substrate 121.

Figure 6:
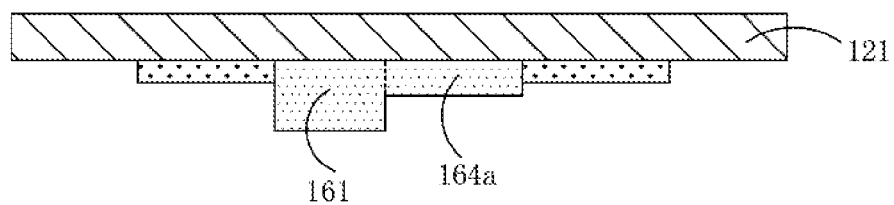

With reference to FIG. 6, red color resist blocks 161 and first color resist layer 164*a* are formed simultaneously on the second underlay substrate 121 by a halftone mask technology. A thickness of each of the red color resist blocks 161 is greater than a thickness of each of the first color resist layer 164*a*.

Figure 7:
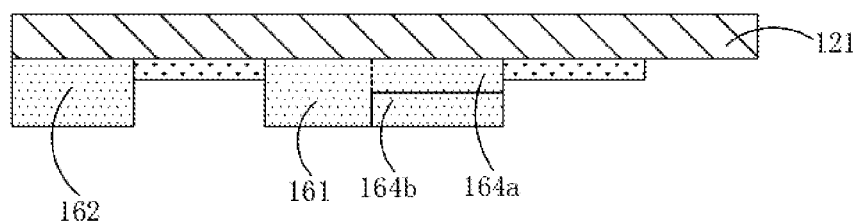

With reference to FIG. 7, by a halftone mask technology, green color resist blocks 162 are formed on the second underlay substrate 121 and second color resist layer 164*b* are formed on the first color resist layer 164*a* simultaneously. The first color resist layer 164*a* and the second color resist layer 164*b* form the light shielding portion 164.

Figure 8:
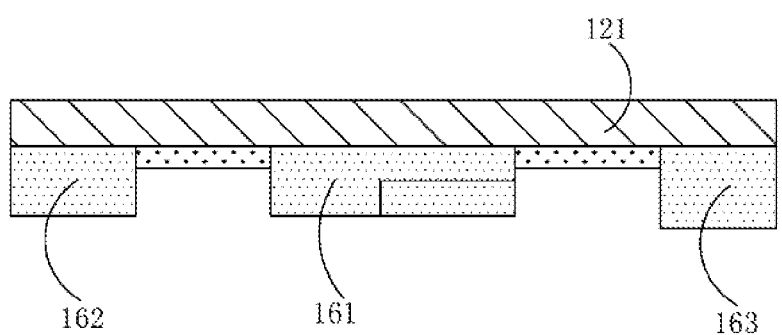

With reference to FIG. 8, blue color resist blocks 163 are formed on the second underlay substrate 121 to form a color filter layer.

Figure 9:
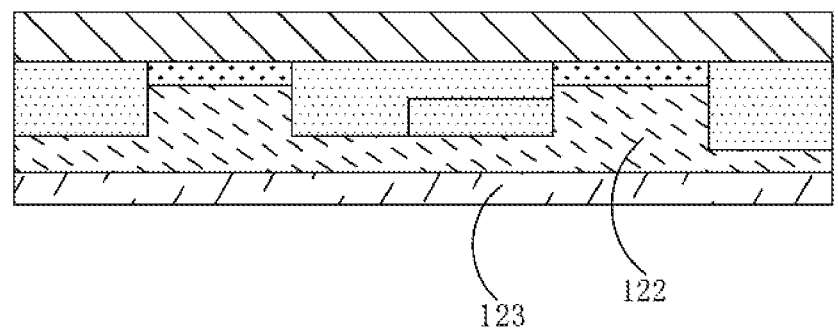

With reference to FIG. 9, after a second pixel electrode 122 is formed on the color filter layer and the light shielding block 17, a second alignment film layer 123 is formed on the second pixel electrode 122.

Figure 10:
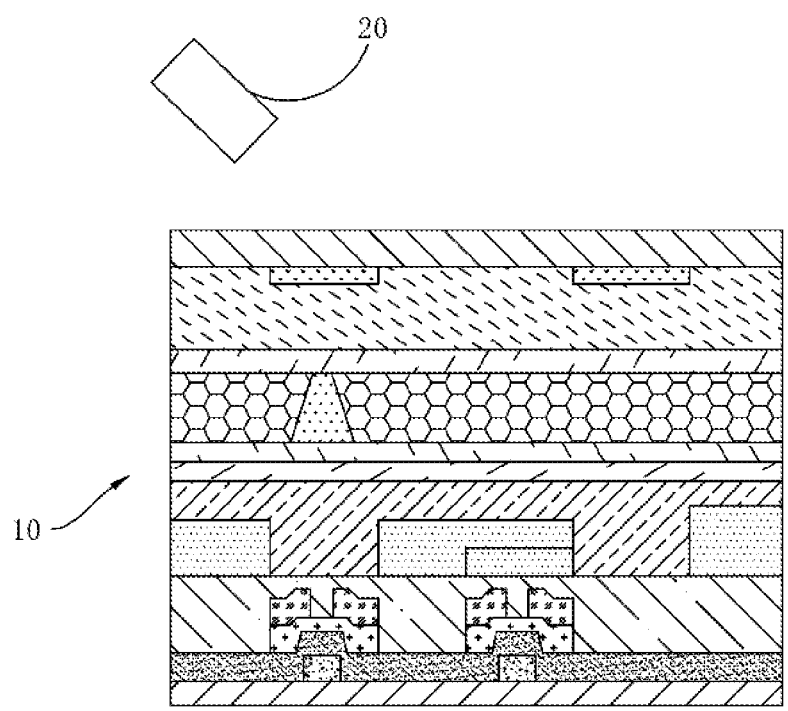
FIG. 10 is a schematic structural view of a liquid crystal display device of an embodiment of the present invention.

Based on the above liquid crystal display panel 10, the present invention further provides a liquid crystal display device. With reference to FIG. 10, the liquid crystal display device comprises a light beam emitter 20 and the liquid crystal display panel 10 as in any one of the above embodiments. The light beam emitter 20 is configured to transmit a projection light beam for setting a color. The optical sensor of the liquid crystal display panel 10 detects the projection light beam projected by the light beam emitter 20 onto the liquid crystal display panel 10.

In the above-mentioned embodiments, the descriptions of the various embodiments are focused. For the details of the embodiments not described, reference may be made to the related descriptions of the other embodiments.

The principles and implementations of the present application are described in the following by using specific examples. The description of the above embodiments is only for assisting understanding of the technical solutions of the present application and the core ideas thereof. Those of ordinary skill in the art should understand that they can still modify the technical solutions described in the foregoing embodiments are or equivalently replace some of the technical features. These modifications or replacements do not depart from the essence of the technical solutions of the embodiments of the present application.

What is claimed is:

1. A liquid crystal display panel, comprising:
a first substrate, comprising a first underlay substrate;
a second substrate disposed opposite to the first substrate;
an optical sensor disposed on a side of the first underlay substrate near the second substrate, wherein the optical sensor comprises a sensing transistor, the sensing transistor comprises a first gate electrode, a first semiconductor, and a first source and drain electrode connected to the first semiconductor; and
a color filter layer disposed on a side of the first semiconductor away from the first underlay substrate, wherein the color filter layer comprises a plurality of color resist blocks arranged at intervals;
wherein the color filter layer further comprises a light shielding portion located between adjacent two of the color resist blocks, and an orthographic projection of the light shielding portion on the first underlay substrate covers an orthographic projection of the first semiconductor on the first underlay substrate;
wherein the light shielding portion is configured to shield ambient light other than light of a wavelength from 570 to 630 nms;
wherein the optical sensor further comprises a switch transistor, the switch transistor comprises a second gate electrode disposed in a same layer with the first gate electrode, a second semiconductor disposed in a same layer with the first semiconductor, and a second source and drain electrode disposed in a same layer with the first source and drain electrode; and
wherein a light shielding layer is disposed on a side of the second semiconductor away from the first underlay substrate, a gap region is defined between adjacent two of the color resist blocks, the light shielding layer comprises a light shielding block disposed in the gap region and located adjacent to the light shielding portion disposed in the gap region such that the light shielding block and the light shielding portion commonly shield the gap region, and an orthographic projection of the light shielding block on the first underlay substrate covers an orthographic projection of the second semiconductor on the first underlay substrate.

2. The liquid crystal display panel as claimed in claim 1, wherein the light shielding portion comprises a first color resist layer and a second color resist layer stacked on each other, and a color of the first color resist layer is different from a color of the second color resist layer.

3. The liquid crystal display panel as claimed in claim 2, wherein the first color resist layer is one of a red color resist layer and a green color resist layer, the second color resist layer is the other of the red color resist layer and the green color resist layer.

4. The liquid crystal display panel as claimed in claim 2, wherein the first color resist layer or the second color resist layer is formed integrally with an adjacent one of the color resist blocks.

5. The liquid crystal display panel as claimed in claim 4, wherein a thickness of the color resist block integrally formed with the first color resist layer or the second color resist layer is equal to a thickness of the light shielding portion.

6. The liquid crystal display panel as claimed in claim 1, wherein an orthographic projection of the light shielding portion on the first underlay substrate overlaps an orthographic projection of the first semiconductor on the first underlay substrate.

7. The liquid crystal display panel as claimed in claim 1, wherein the first substrate further comprises:
a gate electrode insulation layer covering the first gate electrode and the second gate electrode, wherein the first semiconductor and the second semiconductor are disposed on a side of the gate electrode insulation layer away from the first underlay substrate, the first source and drain electrode is disposed on a side of the first semiconductor away from the first underlay substrate, and the second source and drain electrode is disposed on a side of the second semiconductor away from the first underlay substrate; and a passivation layer covering the first semiconductor, the first source and drain electrode, the second semiconductor, the second source and drain electrode, and the gate electrode insulation layer; and the color filter layer is disposed on a side of the passivation layer away from the first underlay substrate.

8. The liquid crystal display panel as claimed in claim 1, wherein the second substrate comprises a second underlay substrate, the color filter layer is disposed on a side of the second underlay substrate near the first substrate.

9. A liquid crystal display device, comprising a light beam emitter and a liquid crystal display panel, the light beam emitter configured to emit a projection light beam for setting a color, and the liquid crystal display panel comprising:

a first substrate, comprising a first underlay substrate;

a second substrate disposed opposite to the first substrate;

an optical sensor disposed on a side of the first underlay substrate near the second substrate, wherein the optical sensor sensing a projection light beam projected by the light beam emitter to the liquid crystal display panel, and the optical sensor comprises a sensing transistor, the sensing transistor comprises a first gate electrode, a first semiconductor, and a first source and drain electrode connected to the first semiconductor; and a color filter layer disposed on a side of the first semiconductor away from the first underlay substrate, wherein the color filter layer comprises a plurality of color resist blocks arranged at intervals;

wherein the color filter layer further comprises a light shielding portion located between adjacent two of the color resist blocks, and an orthographic projection of the light shielding portion on the first underlay substrate covers an orthographic projection of the first semiconductor on the first underlay substrate;

wherein the light shielding portion is configured to shield ambient light other than light of a wavelength from 570 to 630 nms;

wherein the optical sensor further comprises a switch transistor, the switch transistor comprises a second gate electrode disposed in a same layer with the first gate electrode, a second semiconductor disposed in a same layer with the first semiconductor, and a second source and drain electrode disposed in a same layer with the first source and drain electrode; and wherein a light shielding layer is disposed on a side of the second semiconductor away from the first underlay substrate, a gap region is defined between adjacent two of the color resist blocks, the light shielding layer comprises a light shielding block disposed in the gap region and located adjacent to the light shielding portion disposed in the gap region such that the light shielding block and the light shielding portion commonly shield the gap region, and an orthographic projection of the light shielding block on the first underlay substrate covers an orthographic projection of the second semiconductor on the first underlay substrate.

10. The liquid crystal display device as claimed in claim 9, wherein the light shielding portion comprises a first color resist layer and a second color resist layer stacked on each other, and a color of the first color resist layer is different from a color of the second color resist layer.

11. The liquid crystal display device as claimed in claim 10, wherein the first color resist layer is one of a red color resist layer and a green color resist layer, the second color resist layer is the other of the red color resist layer and the green color resist layer.

12. The liquid crystal display device as claimed in claim 11, wherein a color of the projection light beam is yellow.

13. The liquid crystal display device as claimed in claim 10, wherein the first color resist layer or the second color resist layer is formed integrally with an adjacent one of the color resist blocks.

14. The liquid crystal display device as claimed in claim 13, wherein a thickness of the color resist block integrally formed with the first color resist layer or the second color resist layer is equal to a thickness of the light shielding portion.

15. The liquid crystal display device as claimed in claim 14, wherein a thickness of the first color resist layer and a thickness of the second color resist layer are 1-1.5 microns.

16. The liquid crystal display device as claimed in claim 9, wherein an orthographic projection of the light shielding portion on the first underlay substrate overlaps an orthographic projection of the first semiconductor on the first underlay substrate.

17. The liquid crystal display device as claimed in claim 9, wherein the first substrate further comprises:

a gate electrode insulation layer covering the first gate electrode and the second gate electrode, wherein the first semiconductor and the second semiconductor are disposed on a side of the gate electrode insulation layer away from the first underlay substrate, the first source and drain electrode is disposed on a side of the first semiconductor away from the first underlay substrate, and the second source and drain electrode is disposed on a side of the second semiconductor away from the first underlay substrate; and a passivation layer covering the first semiconductor, the first source and drain electrode, the second semiconductor, the second source and drain electrode, and the gate electrode insulation layer; and the color filter layer is disposed on a side of the passivation layer away from the first underlay substrate.

18. The liquid crystal display device as claimed in claim 9, wherein the second substrate comprises a second underlay substrate, the color filter layer is disposed on a side of the second underlay substrate near the first substrate.

* * * * *